United States Patent [19]
Schultz et al.

[11] 3,719,377
[45] March 6, 1973

[54] TURNBUCKLE

[75] Inventors: Robert D. Schultz; John DiMartino, both of Sayville, N.Y.

[73] Assignee: Peck & Hale Inc., West Sayville, N.Y.

[22] Filed: July 21, 1970

[21] Appl. No.: 56,928

[52] U.S. Cl. ............................287/60, 29/175 R
[51] Int. Cl. ................................................F16b 7/06
[58] Field of Search.....287/59, 60, 61, 91; 29/175 R; 59/93, 95; 24/123 A; 267/70, 71

[56] References Cited

UNITED STATES PATENTS

| | | | |
|---|---|---|---|
| 1,006,950 | 10/1911 | Keddy | 287/61 X |
| 3,343,858 | 9/1967 | Rice | 267/70 X |
| 2,234,492 | 3/1941 | Henry | 24/123.1 X |
| 544,568 | 8/1895 | Desailly et al. | 267/70 UX |
| 1,005,301 | 10/1911 | Pipher | 24/123.1 UX |
| 346,771 | 8/1886 | Phillips | 287/60 X |
| 2,403,828 | 7/1946 | Rawlins et al. | 287/60 |

Primary Examiner—Andrew V. Kundrat
Attorney—Pennie, Edmonds, Morton, Taylor & Adams

[57] ABSTRACT

A turnbuckle is disclosed comprising a body member having a slit extending longitudinally therethrough, said slit having a reduced width portion forming an internal shoulder in the body member, an adjustment rod having a threaded portion, said rod being positioned in the slit with its threaded portion situated in the wide portion of the slit, a nut member disposed within the wide portion of the slit in threaded engagement with the adjustment rod, and a plurality of adjustment spacers seated on the rod within the wide portion of the slit and held in abutting relationship to the internal shoulder by the nut member.

16 Claims, 13 Drawing Figures

PATENTED MAR 6 1973 3,719,377

INVENTORS
ROBERT D. SCHULTZ
JOHN M. DI MARTINO

BY
Pennie, Edmonds, Morton, Taylor & Adams

ATTORNEYS

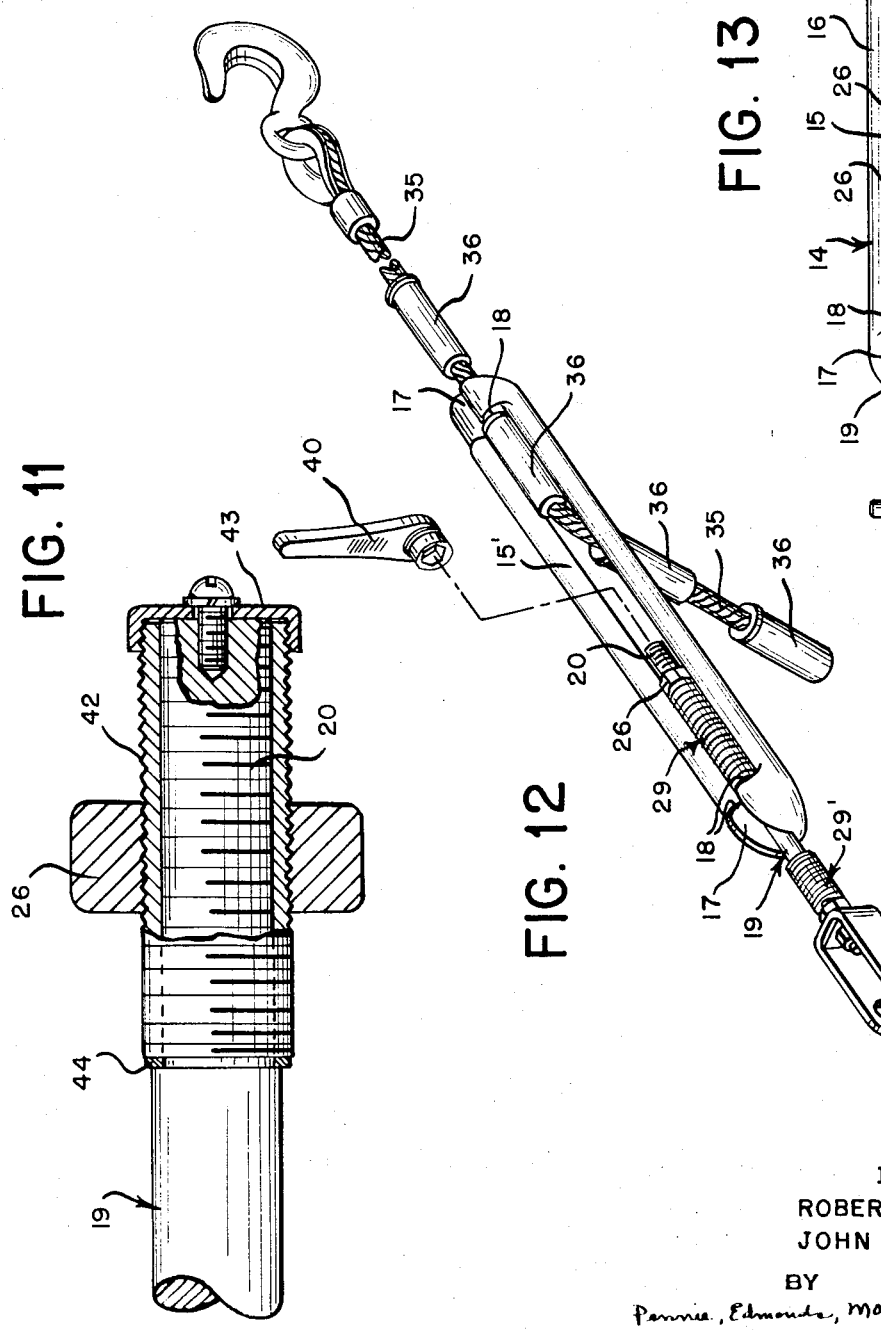

3,719,377

TURNBUCKLE

BACKGROUND OF THE INVENTION

Prior to this invention, mechanics, stevedores and other workmen have been accustomed to using turnbuckles to take up undesirable slack in a wide range of tiedown assemblies. With presently available turnbuckles, length and tension adjustments are accomplished by rotating threaded parts of the turnbuckle relative to each other. The threaded parts of conventional turnbuckles generally include an elongated housing internally threaded at each end and twin adjustment rods threadedly engaging the respective ends of the housing. The end of each adjustment rod disposed externally of the housing is suitably attached to a tiedown cable so that the turnbuckle together with the two tiedown cables form a single composite length. The direction of the threads is generally such that rotation of the housing causes the two adjustment rods to move toward each other thereby increasing tension and taking up slack in the tiedown cable. Reverse rotation of the housing, of course, causes the adjustment rods to move away from each other. Adjustment of conventionally constructed turnbuckles is a slow and often tedious process. Moreover, in order to provide an adequate adjustment range each adjustment rod must be threaded over its entire length thus increasing the cost of producing such turnbuckles.

Also, when it is desired to disassemble the tiedown assembly, as for example to change its component parts to suit a particular application, a conventional turnbuckle forming a part of the tiedown assembly must be rotated through its entire thread length before it can be broken down into its component parts. This procedure is time consuming and inconvenient and generally detracts from the overall usefulness of the turnbuckle. Further, the threaded adjustment rods are constantly exposed to the atmosphere with consequent danger of corrosion to the working parts of the turnbuckle. To prevent corrosion damage, expensive corrosion resistant materials must be used thereby further increasing cost.

SUMMARY OF THE INVENTION

In accordance with the teachings of the present invention a new and improved turnbuckle is provided. In construction the turnbuckle comprises an elongated body member having a slit therein which extends longitudinally through at least a portion of the body member. One portion of the slit is smaller in width than the remaining portion of the slit. With this arrangement an internal shoulder is formed in the body member extending inwardly of the slit. An elongated adjustment rod having a threaded portion at one end and a cable connector at the other end is disposed within the slit with its threaded end situated in the wider portion of the slit and its other end situated exteriorly of the body member. A plurality of spacers are slidably mounted on the adjustment rod and a nut member threadedly engaging the threaded end of the adjustment rod prevents the spacers from sliding off the adjustment rod. Both the spacers and nut member are dimensioned to fit into the wider portion of the slit with the spacers, as a unit, abutting against the internal shoulder. The spacers are held in abutting relationship with respect to the shoulder by the nut member; and in this position the spacers act to prevent movement of the adjustment rod with respect to the body member.

With the turnbuckle construction described above, it will be seen that length and tension adjustments in the tiedown assembly can be made quickly simply by placing the adjustment rod into the slit with the desired number of spacers proportioned between the nut member and the internal shoulder. This gives a coarse approximation of the proper adjustment. Further, fine adjustment can be accomplished simply by tightening the nut member against the spacers until the required tension or length is obtained.

BRIEF DESCRIPTION OF THE DRAWINGS

FIG. 11 is a side elevation, partly in section, of another protective covering for the threaded portion of the adjustment rod.

FIG. 12 is a perspective view of an alternative embodiment of the turnbuckle of the present invention.

FIG. 13 is a isometric view of yet another alternative embodiment of the present invention.

DETAILED DESCRIPTION OF THE INVENTION

Figure 1:
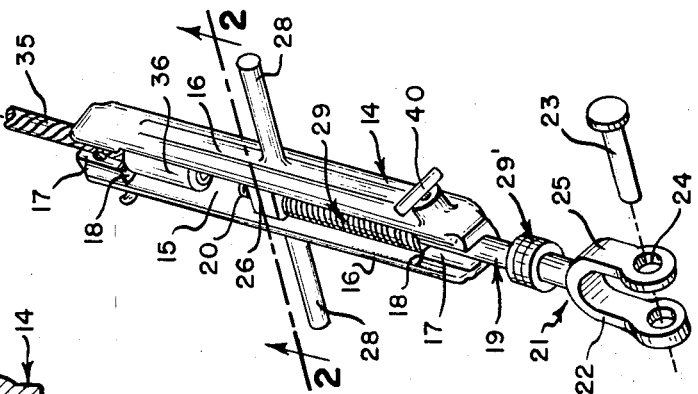
FIG. 1 is a perspective view of the turnbuckle of the present invention.
Figure 2:
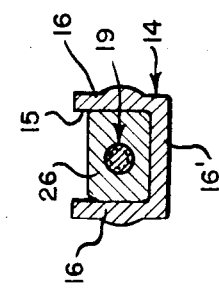
FIG. 2 is a sectional view taken along line 2—2 of FIG. 1.

With reference to the construction shown in FIG. 1, the turnbuckle of this invention comprises an elongated body member 14 having a longitudinal slit 15 extending therethrough. As shown most clearly in FIG. 2 the slit 15 is defined by side walls 16 and bottom wall 16' extending between side walls 16. As shown, the slit is formed with reduced width portions 17 located at each end of the body member 14. The reduced width portions 17 define shoulders 18 the purpose of which will be described more fully below.

An adjustment rod assembly is positioned with the slit. This assembly includes an elongated adjustment rod 19 disposed within the slit at one end of the body member. The adjustment rod has a diameter slightly less than the width of the slit at the reduced diameter portions 17 so that the adjustment rod can move longitudinally with respect to the body member when positioned in the slit. One portion of the adjustment rod 19, preferably that portion near one end, is threaded and this portion is disposed within the wider portion of the slit. The length of the threaded portion is small in relation to the overall length of adjustment rod the purpose of which will be described more fully below.

The adjustment rod is terminated at the end opposite to its threaded end 20 with a connector 21 suitable for attachment to a component of the tiedown assembly, as for example, a cable. The connector 21 shown in FIG. 1 comprises a conventionally structured shackle consisting of clevis 22 and draw pin 23 which is adapted to extend through aligned receiving holes 24 provided in the legs 25 of the clevis. Other suitable connectors will readily come to mind by those skilled in the art as for example a hook or eyelet structure.

A nut member 26 threadedly engages the threaded end 20 of the adjustment rod. In the construction shown in FIG. 1, the nut member 26 has a size and shape permitting it to fit into the wider portion of the slit 15 but preventing it from rotating relative to body member. Thus, as shown most clearly in FIG. 2, the nut member 26 slip fits within the slit with opposing flat faces thereof bearing snugly against the side walls 16 of slit 15. With this arrangement the nut member 26 cannot be rotated with respect to the body member 14. The nut member can however be rotated relative to the adjustment rod simply by rotating the body member 14. To facilitate rotation of the body member handles 28 depending outwardly from the side walls 16 at a point intermediate the length of body member 14 are provided.

Figure 3:
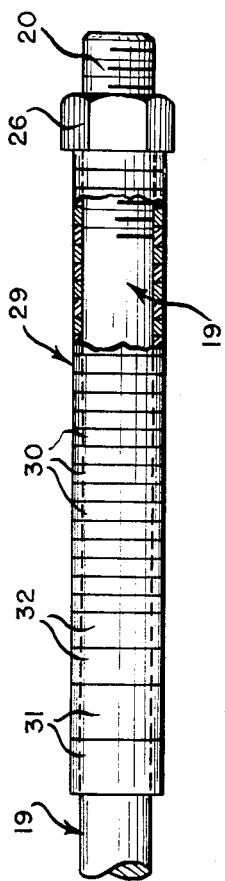
FIG. 3 is a side elevation, partly in section, of the adjustment rod showing the threaded portion, spacers and adjustment nut.
Figure 4:
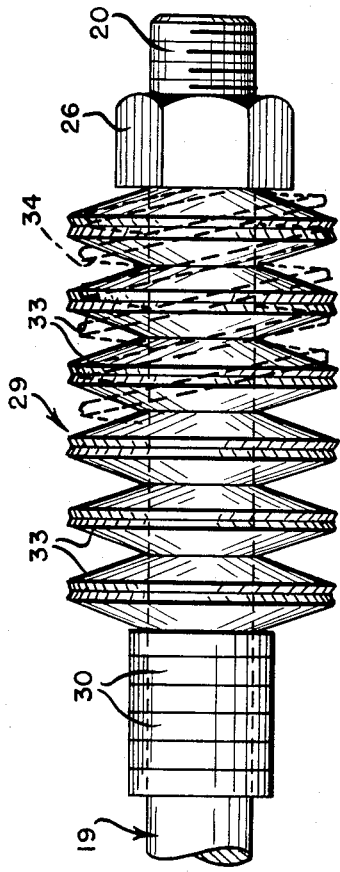
FIG. 4 is a side elevation, of the threaded part of the adjuster rod showing the use of spring-type spacers in combination with ordinary rigid spacers.

The adjustment rod 19 carries a plurality of spacers 29 between the threaded portion thereof and the connector 21. The spacers are slidably mounted on the adjustment rod 19 for free movement and selective positioning therealong. The nut member 26 acts to prevent the spacers from slipping off the adjustment rod. The spacers are sized to fit within the wider portion of the slit and they may have any desired shape, the presently preferred shape being round as shown in the drawings. In the construction shown in FIG. 1, the spacers 29 consist of conventional rigid washers 30 of equal thickness. Alternatively, as shown in FIG. 3, rigid washers of varying thickness, such as washers 31 and 32 may be used as spacers. As shown in FIG. 4, the spacers may consist of spring washers 33 or a combination of rigid washers 30 of equal or varying thickness and spring washers 33 may be used. In yet another alternative embodiment, one or more coil springs, indicated by dotted lines 34 in FIG. 4 may be used as spacers either along or with any combination of rigid or spring washers of the type shown in FIGS. 3 and 4. In addition to those mentioned, persons skilled in the art will readily perceive that an infinite number of other combinations can be used.

With reference again to FIG. 1, it will be seen that the spacers 29 disposed within the slit abut, as a group against the shoulder 18 and are held in abutting relationship with respect thereto by nut member 26 which, when tightened along the adjustment rod, bears against the spacer situated most remotely from the shoulder 18.

The end of the turnbuckle opposite to the end carrying the adjustment rod assembly is attached to cable 35 of the tiedown assembly by means of ferrule 36 secured to the end of cable 35. As shown in FIG. 1, the ferrule 36 fits within the wide portion of slit and abuts against the shoulder 18 formed in this end of the body member while the adjacent portion of cable 35 extends through the reduced diameter portion of the slit.

As shown in the construction depicted in FIG. 12, more than one ferrule 36 may be secured to the cable 35 in spaced relationship to each other thereby defining an adjustable pendant tail. In this construction of the turnbuckle, a section of the bottom wall of body member has been removed so that the wide portion of the slit is defined by a slot 15' extending through the body member in a direction perpendicular to its longitudinal axis. With this arrangement one of ferrules 36 abuts against shoulder 18 like the ferrule 36 shown in FIG. 1 and the pendant tail extends through the slot 15' as shown in FIG. 12. In order that the pendant tail will not interfere with rotation of the body member to adjust the nut member along the adjustment rod, the nut member 26 is reduced in size from the size shown in FIG. 1 and 2 so that it is rotatable independently of the body member. In this case a separate tool 40 is provided to rotate the nut member. The tool 40 may be either manually or power operated.

As shown in FIG. 13, both ends of the turnbuckle may be equipped with an adjustment rod assembly as described in connection with FIG. 1. In this case the nut members 26 may be constructed to rotate with the body member like the construction shown in FIG. 1 or independently of the body member as in the construction described in connection with FIG. 12. In the construction actually shown in FIG. 13, the nut members are constructed to rotate independently of the body member.

Figure 5:
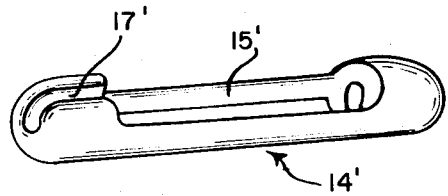
FIGS. 5 – 9 are perspective views of alternative embodiments of the body member of the turnbuckle of this invention.
Figure 6:
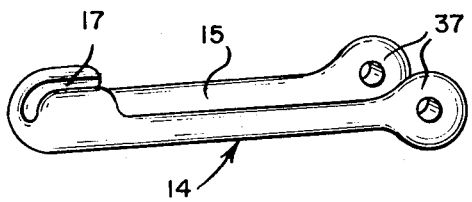
Figure 7:
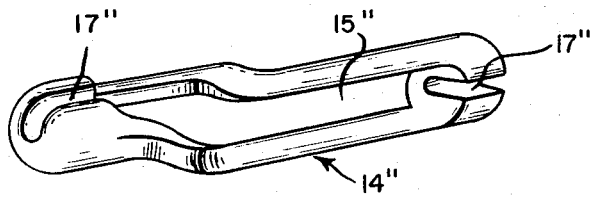

FIGS. 5–9 show several alternative constructions of the body member of the turnbuckle. In FIGS. 5 and 7 the body members shown are essentially identical to the construction described above in connection with FIG. 1 with the exception that the narrower terminal portions of slit at each end of the body member face in different directions. Thus, with reference to FIG. 5, the narrower terminal portions 17' of slit 15' face in opposite directions or 180° apart while, in FIG. 7, the narrower terminal portions 17" of slit 15" face in perpendicular directions with respect to each other. With this arrangement access to the turnbuckle for purposes of installing the adjustment rod assembly, pendant tail or a single ferruled cable into the slit can be varied depending on the nature of the work area. For example, obstacles in the work area which might interfere with the path of access to the slit in the body member shown in FIG. 1, can be advantageously avoided simply by using a body member in which the narrow portions of slit face in the proper directions. It is to be recognized that the narrow portions of the slit may face in any desired direction other than the directions shown in FIGS. 5 and 7; the choice of the proper direction being entirely within the discretion of the user.

Figure 8:
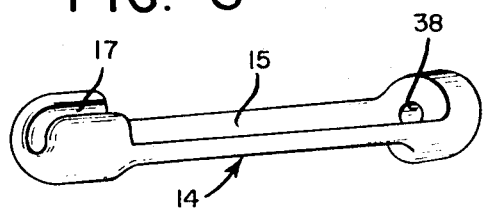
Figure 9:
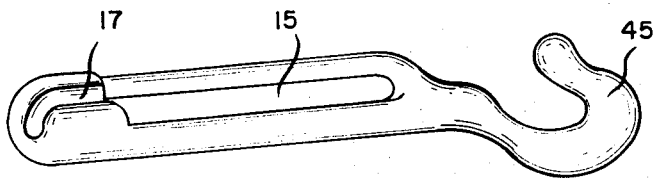

With reference now to FIGS. 7–9 it will be seen that the body member may be terminated at one end by a variety of useful structures including, among others, clevis connector 37 as shown in FIG. 6, swivel hole 38 as shown in FIG. 8, or hook 45 as shown in FIG. 9. Terminal structures other than the ones shown can be used; such other structures being readily apparent to those skilled in the art.

The basic procedure used to adjust the tension in a tiedown assembly employing the turnbuckle of the present invention will now be described with reference to the construction shown in FIG. 1. Any modifications to this basic procedure for the other constructions will be obvious from the following description taken in conjunction with the relevant portions of the specification dealing with these other constructions.

The turnbuckle shown in FIG. 1 is installed in the tiedown assembly by first placing the ferrule secured to cable 35 within the slit at one end of the body member so that the ferrule is seated against the respectively situated shoulder 18. Next the adjustment rod assembly is prepared for insertion in the opposite end of the body member. First a rough approximation of the required length of the tiedown cable is made and an appropriate number of spacers required to produce this length is selected. These spacers are then moved along the adjustment rod until they engage the nut member. The adjustment rod is then placed into the slit at the opposite end of the body member with the preselected spacers disposed within the wide portion of the slit in abutting relationship to the respectively situated shoulder. Any left over spacers as for example spacers 29' are positioned exteriorly of the body in the position shown in FIG. 1. Initial adjustment of the tiedown cable length is now complete. Fine adjustment of its length may now be made simply by rotating the body member to tighten the nut member along the adjustment rod until the proper tension is achieved. To prevent the cable 35 and adjustment rod assembly from accidentally popping out of the slit in the body member set screw type safety locks 39 have been provided. The set screws project into the narrow portion of the slit to engage the adjustment rod and cable 35 disposed in the respective narrow portions of the slit. These locks may now be set to complete the adjustment procedure.

With the turnbuckle of the present invention several advantages, in addition to those already mentioned are provided. First of all, it will be recognized that the turnbuckle can be adjusted very rapidly. The use of spacers for the initial adjustment eliminates much of the turning action required to adjust previously known turnbuckles. With the turnbuckle of the present invention the amount of turning or thread adjustment is minor; one or two turns being sufficient in most cases and, in some cases, no turning at all will be necessary. The lack of appreciable turning or thread adjustment is also advantageous for purposes of disassembly which can be accomplished quickly and conveniently simply by loosening the nut member by turning it very slightly and then lifting the adjustment rod assembly out of the body member.

Figure 10:
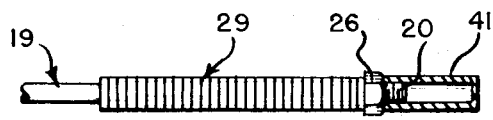
FIG. 10 is a side elevation, partly in section, of the adjustment rod showing a protective covering for the exposed threaded portion thereof.

Due to the minor amount of thread adjustment required, the length of the threaded portion of the adjustment rod may be made quite small in relation to the overall length of the adjustment rod. This renders manufacture of the adjustment rod considerably less expensive than conventional adjustment rods which are threaded over their entire lengths. Also, the danger of thread damage is considerably reduced not only because of the small number of threads but also because most of the threads are covered by either the spacers or the nut member. Moreover, the threads that are not so covered and thus exposed to possible damage, as for example, by a corrosive atmosphere in which the turnbuckle is used or by nicking caused by contact with foreign objects are so positioned that they may be easily provided with a protective covering. That is, the exposed threads are always located on one side only of the nut member. A suitable cover for the short threaded portion of the adjuster rod not covered by either the spacers or nut member is shown in FIG. 10. As shown in FIG. 10, the protective covering comprises a cylindrical jacket 41 concentrically disposed about the adjustment rod. The jacket 41 is attached at one end to the nut member for movement with the nut member relative to the adjustment rod. The other end of the jacket is closed. Relative movement between the adjustment rod and nut member during rotation of the latter causes the threaded portion of the adjustment to project into the jacket. The degree of penetration into the jacket at any given time is proportional to the longitudinal position of the nut member with respect to the adjustment rod. This is due to the fact that the jacket and nut member move as a unit relative to adjustment rod. The length of the jacket 41 is approximately equal to the distance between the end of the adjustment rod which is disposed within the slit and the thread located most remotely from that end. With this arrangement, the threaded portion of the adjustment rod is fully covered by either the spacers and/or the nut member and/or the jacket for each axial position of the nut along the adjustment rod.

Another form of protective covering which is particularly useful when the turnbuckle is used in a corrosive atmosphere, as for example a marine environment, is shown in FIG. 11. In this embodiment, an internally and externally threaded sleeve 42 made of corrosion resistant material is threaded onto the threaded portion of the adjustment rod. The nut member 26 threadedly engages the sleeve 42 as shown. End cap 43 and gasket 44 seal off all internal points of contact between the dissimilar materials of the adjustment rod and sleeve. Thus corrosion which normally results from galvanic or electrolytic action at the interface between two dissimilar materials in a marine environment is effectively prevented. This type of protective covering is a vast improvement over conventional plating, galvanizing or coating techniques commonly employed to protect the threaded portions of conventional turnbuckles.

It will also be observed that the body member of the turnbuckle is completely devoid of threads. It is therefore significantly easier and less costly to produce and may be readily interchanged from one tiedown assembly to another.

The use of spring washers or coil springs as spacers provide the entire tiedown assembly with shock absorption and spring movement. Furthermore, the spring spacers may be constructed to deflect at predetermined loads thus providing a controlled amount of tension in the tiedown assembly.

The turnbuckle of the present invention provides virtually an unlimited range of adjustment since the thickness of the individual spacers may be varied to provide any desired incremental adjustment capability. This is especially true when an adjustment rod assembly is used at both ends of the body member or when a pendant tail and adjustment rod assembly is utilized. In addition the existing set of spacers may be removed simply by removing the nut member and sliding the spacers off the adjustment rod. A new set of spacers providing a different incremental adjustment capability may then be installed. This ability to change the spacer configuration imparts to the turnbuckle a degree of flexibility not found in prior art constructions.

We claim:

1. An adjustable turnbuckle having a longitudinal axis comprising:

a. an elongated body member having a slit extending longitudinally through at least one end of the body member, said slit having a reduced width portion defining an internal abutment shoulder in the body member and said shoulder extending in a direction perpendicular to the longitudinal axis of the body member and opening through at least one side face thereof to form an open portion; and
b. an adjustment rod assembly removably positioned within the slit at said one end of the body member, said assembly including:
  1. an elongated rod having a threaded portion, said rod being positioned within the slit for longitudinal movement with respect to the body member with its threaded portion disposed within the wide portion of the slit;
  2. a nut member disposed within the wide portion of the slit in threaded engagement with the rod; and
  3. a plurality of spacers slidably mounted on the rod for selective positioning therealong, at least one of said spacers being positioned within the wide portion of the slit between the nut member and the internal shoulder of the body member, each of said spacers being held as a group in abutting relationship with respect to the internal shoulder by the nut member, said rod being movable in a direction perpendicular to the longitudinal axis through the open portion of said slit to facilitate the removal or addition of said spacers from said wide portion of said slit to permit coarse adjustment of said turnbuckle and relative rotation of said nut member with respect to said threaded portion of said rod permits fine adjustment of said turnbuckle.

2. The turnbuckle according to claim 1 wherein:
a. said slit extends longitudinally through both ends of the body member; and
b. each end of the slit has a reduced width portion defining an internal shoulder at each end of the body member.

3. The turnbuckle according to claim 2 wherein the reduced width portions of the slit at opposite ends of the body member face in different directions with respect to each other.

4. The turnbuckle according to claim 3 wherein said reduced width portions face in perpendicular directions with respect to each other.

5. The turnbuckle according to claim 3 wherein said reduced width portions face in opposite directions with respect to each other.

6. The turnbuckle according to claim 2 wherein each end of the body member is provided with said adjustment rod assembly.

7. The turnbuckle according to claim 1 wherein said nut member fits snugly within the wide portion of the slit, said nut member having opposite flat faces bearing against the inwardly facing side walls of the slit in cooperating relationship therewith such that rotation of said body member causes corresponding rotation of said nut member to finely adjust the longitudinal position of said rod with respect to the body member.

8. The turnbuckle according to claim 1 wherein the nut member fits loosely within the wide portion of the slit such that said nut member is rotatable independently of said body and fine adjustments of said turnbuckle may be made by rotating said nut member with respect to the threaded portion of said rod so as to vary the longitudinal position of said rod with respect to the body member.

9. The turnbuckle according to claim 1 wherein the end of said body member opposite to said one end is defined by means for connecting said opposite end to an associated component of a tiedown assembly employing the turnbuckle.

10. The turnbuckle according to claim 7 wherein the body member is provided with locking means for holding the elongated rod within said slit.

11. The turnbuckle according to claim 2 including a flexible tiedown element having a ferrule secured to one end, said tiedown element being disposed within the slit with the ferrule disposed in the wide portion of the slit in abutting relationship with the internal shoulder situated at said opposite end of the slit.

12. The turnbuckle according to claim 11 wherein:
a. at least a portion of the wide portion of the slit is defined by a slot which extends laterally through both side faces of said body member in a direction perpendicular to the longitudinal axis thereof;
b. said flexible tiedown element has a plurality of ferrules secured in spaced relationship along its length, said tiedown element extending through said slot with one of said ferrules seated within the wide portion of the slot in abutting relationship to the shoulder at said opposite end of the body member.

13. The turnbuckle according to claim 1 wherein said adjustment rod assembly includes covering means for shielding the exposed threads of the elongated rod.

14. The turnbuckle according to claim 1 wherein at least one of said spacers is a resilient means which facilitates shock absorption and spring movement for said turnbuckle.

15. The turnbuckle according to claim 14 wherein at least one of said resilient spacers comprises a coil spring.

16. The turnbuckle according to claim 14 wherein at least one of said resilient spacers comprises a spring washer.

* * * * *